United States Patent
Haraguchi et al.

(10) Patent No.: US 8,466,241 B2
(45) Date of Patent: Jun. 18, 2013

(54) METHOD FOR PRODUCING HIGHLY BRANCHED POLYMER

(75) Inventors: Masayuki Haraguchi, Funabashi (JP); Hideki Musashi, Funabashi (JP); Satoru Hatayama, Sanyoonoda (JP); Masaaki Ozawa, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 3 days.

(21) Appl. No.: 13/265,030

(22) PCT Filed: Apr. 30, 2010

(86) PCT No.: PCT/JP2010/057700
§ 371 (c)(1),
(2), (4) Date: Oct. 28, 2011

(87) PCT Pub. No.: WO2010/126140
PCT Pub. Date: Nov. 4, 2010

(65) Prior Publication Data
US 2012/0059136 A1 Mar. 8, 2012

(30) Foreign Application Priority Data
May 1, 2009 (JP) ................. 2009-112337

(51) Int. Cl.
*C08F 2/00* (2006.01)
*C08F 4/04* (2006.01)
*C08F 22/26* (2006.01)
*C08F 12/34* (2006.01)

(52) U.S. Cl.
USPC ...... 526/215; 526/323.1; 526/336; 526/218.1

(58) Field of Classification Search
USPC ............................ 526/215, 323.1, 336, 218.1
See application file for complete search history.

(56) References Cited

FOREIGN PATENT DOCUMENTS

| | | |
|---|---|---|
| JP | B2-4009700 | 9/2007 |
| JP | A-2008-38110 | 2/2008 |
| JP | A-2009-155619 | 7/2009 |
| JP | A-2010-24330 | 2/2010 |

OTHER PUBLICATIONS

Hirano et al., "Synthesis and Characterization of Soluble Hyperbranched Polymer via Initiator-Fragment Incorporation Radical Polymerization of Divinylbenzene with Dimethyl 2,2'-Azobisisobutyrate," Journal of Applied Polymer Science, 2006, pp. 664-670, vol. 100.*

(Continued)

*Primary Examiner* — William Cheung
(74) *Attorney, Agent, or Firm* — Oliff & Berridge, PLC

(57) ABSTRACT

A method for producing a highly branched polymer, with which a molecular weight can be controlled without using a polymerization inhibitor and a polymer having a controlled molecular weight can be produced safely even in a case of mass production in an industrial scale. A method for producing a highly branched polymer including polymerizing a monomer A having two or more radical polymerizable double bonds in a molecule, in the presence of a polymerization initiator B in an amount of 5% by mol to 200% by mol with respect to 1 mol of the monomer A at a temperature 20° C. higher than a 10-hour half-life temperature of the polymerization initiator B or higher.

11 Claims, 1 Drawing Sheet

OTHER PUBLICATIONS

Sato, T. et al., "Initiator-Fragment Incorporation Radical Polymerization of Divinylbenzene in the Presence of Glyoxylic Oxime Ether: Formation of Soluble Hyperbranched Polymer," *Journal of Polymer Science: Part A: Polymer Chemistry*, 2003, pp. 3038-3047, vol. 41.

Hirano, T. et al., "Synthesis and Characterization of Soluble Hyperbranched Polymer via Initiator-Fragment Incorporation Radical Polymerization of Divinylbenzene with Dimethyl 2,2'-Azobisisobutyrate," *Journal of Applied Polymer Science*, 2006, pp. 664-670, vol. 100.

Hirano, T. et al., "Formation of Soluble Hyperbranched Polymer Nanoparticles by Initiator-Fragment Incorporation Radical Polymerization of Ethylene Glycol Dimethacrylate," *Macromolecular Chemistry and Physics*, 2005, pp. 860-868, vol. 206.

*Synthesis and Reaction of Polymer* (1), 1992, p. 33 (with abstract).

*Function & Materials*, 2006, pp. 44-52, vol. 26, No. 8 (with abstract).

International Search Report issued in International Application No. PCT/JP2010/057700 on Jun. 1, 2010 (with translation).

Written Opinion of the International Searching Authority issued in International Application No. PCT/JP2010/057700 on Jun. 1, 2010 (with translation).

* cited by examiner

METHOD FOR PRODUCING HIGHLY BRANCHED POLYMER

This U.S. Patent Application is the National Stage of PCT International Application No. PCT/JP2010/057700 filed Apr. 30, 2010, which claims the benefit of priority of Japan Application No. JP 2009-112337 filed May 1, 2009. The entire contents of all the above application are incorporated herein by reference.

TECHNICAL FIELD

The present invention relates to a method for producing a highly branched polymer that is obtained by polymerization of a monomer having two or more radically polymerizable double bonds in the presence of a radical polymerization initiator. In particular, the present invention relates to a production method that can readily control the molecular weight of a highly branched polymer and that can be safely performed even in an industrial scale.

BACKGROUND ART

As a method for producing a highly branched polymer (a hyperbranched polymer), it is proposed a polymerization method of a monomer having two or more radically polymerizable double bonds in the presence of a radical polymerization initiator. Examples of the method include methods for producing a highly branched polymer by so-called initiator-fragment incorporation (co)polymerization that uses a divinyl compound having two vinyl groups or a dimethacryl compound having two methacryl groups and an azo polymerization initiator (see Patent Documents 1 and 2, and Non-patent Documents 1 to 3).

The previously proposed methods for producing a highly branched polymer are characterized by using a monomer having two or more radically polymerizable double bonds, and a radical polymerization initiator in an amount equimolecular or more with respect to that of the monomer. While the monomer is polymerized, the polymerization initiator generates an initiator fragment radical that reacts with a propagating terminal radical of the polymer to stop the reaction and to give a highly branched polymer that includes highly branched polymeric chains, does not include long polymer chains, and is soluble in organic solvents and the like.

DISCLOSURE OF THE INVENTION

Problem to be Solved by the Invention

The production of the highly branched polymer in accordance with the methods above is commonly performed in accordance with conventional radical polymerization method. Specifically, it is performed by pouring a reaction material (a monomer having two or more radically polymerizable double bonds) and a radical polymerization initiator into a solvent and reacting the mixture in a condition at a reaction temperature of 70° C. to 80° C., namely, at a temperature ranging from a temperature 30° C. lower than a 10-hour half-life temperature of the radical polymerization initiator to a temperature 15° C. higher than the 10-hour half-life temperature even when the polymerization temperature is estimated in a relatively wide range (Non-patent Document 4).

However, the monomer having two or more radically polymerizable double bonds is very rapidly polymerized to each other, but the stop reaction by the initiator fragment radical slowly progresses when the number of the initiator fragment radicals generated from the radical polymerization initiator is relatively small compared to the number of the reactive sites in the polymerizing monomer. Hence, the highly branched polymer obtains a molecular weight higher than expected, and as a result, the polymer becomes insoluble in an organic solvent and the dissolution of the polymer in an organic solvent leads to a cloudy solution, which makes the obtained polymer have poor practicability.

Even when a method of adding a polymerization inhibitor for controlling a molecular weight (Patent Document 1 and Non-patent Document 3) is adopted, the method hardly contributes to the molecular weight control, and further, a propagating terminal radical of the polymer is reacted with the polymerization inhibitor and the polymerization inhibitor component is incorporated into the highly branched polymer. Thus, the physical properties of the obtained polymer may have been adversely affected.

Means for Solving the Problem

The inventors of the present invention have carried out intensive studies in order to solve the problem, and as a result, have found that a polymerization, in which a reaction temperature for radical polymerization typically ranging from 30° C. lower than a 10-hour half-life temperature of the radical polymerization initiator to 15° C. higher than the 10-hour half-life temperature is set to a temperature 20° C. higher than the 10-hour half-life temperature or higher, can readily control the molecular weight of a highly branched polymer to be obtained without using a polymerization inhibitor or the like.

It has been also found that the selection of the production conditions, that is, the production of a polymer by dropwise addition of a material solution into a solvent that is heated at a reflux temperature of the solvent can safely give a highly branched polymer having a controlled molecular weight even when the polymer is produced in a large amount in an industrial scale. Thus, the present invention has been accomplished.

That is, as a first aspect, the present invention relates to a method for producing a highly branched polymer characterized by including polymerizing a monomer A having two or more radical polymerizable double bonds in a molecule, in the presence of a polymerization initiator B in an amount of 5% by mol to 200% by mol with respect to 1 mol of the monomer A at a temperature 20° C. higher than a 10-hour half-life temperature of the polymerization initiator B or higher.

As a second aspect, the present invention relates to the production method according to the first aspect characterized in that the polymerization reaction is performed in an organic solvent.

As a third aspect, the present invention relates to the production method according to the second aspect characterized in that the polymerization reaction is performed by adding dropwise a solution containing the monomer A, the polymerization initiator B, and the organic solvent into the organic solvent maintained to have a temperature 20° C. higher than the 10-hour half-life temperature of the polymerization initiator B or higher.

As a fourth aspect, the present invention relates to the production method according to the second aspect or the third aspect characterized in that the polymerization reaction is performed at a reflux temperature of the organic solvent.

As a fifth aspect, the present invention relates to the production method according to any one of the first aspect to the fourth aspect in which the monomer A is a compound having at least any one of a vinyl group and a (meth)acrylic group.

As a sixth aspect, the present invention relates to the production method according to the fifth aspect in which the monomer A is a divinyl compound or a di(meth)acrylate compound.

As a seventh aspect, the present invention relates to the production method according to the sixth aspect in which the monomer A is divinylbenzene or ethylene glycol di(meth)acrylate.

As an eighth aspect, the present invention relates to the production method according to any one of the first aspect to the seventh aspect in which the polymerization initiator B is an azo polymerization initiator.

As a ninth aspect, the present invention relates to the production method according to the eighth aspect in which the polymerization initiator B is an initiator having a 10-hour half-life temperature of 30 to 120° C.

As a tenth aspect, the present invention relates to the production method according to the ninth aspect in which the polymerization initiator B is an initiator having a 10-hour half-life temperature of 40 to 70° C.

As an eleventh aspect, the present invention relates to the production method according to the tenth aspect in which the polymerization initiator B is dimethyl 2,2'-azobisisobutyrate or 2,2'-azobis(2-methylbutyronitrile).

As a twelfth aspect, the present invention relates to the production method according to any one of the second aspect to the eleventh aspect in which the organic solvent is an organic solvent having a boiling point of 90 to 200° C. under atmospheric pressure.

As a thirteenth aspect, the present invention relates to the production method according to any one of the first aspect to the twelfth aspect in which the highly branched polymer is a polymer having a weight average molecular weight (Mw) of 1,000 to 200,000 in terms of polystyrene determined by gel permeation chromatography.

Effects of the Invention

The production method of the present invention does not require means of adding a polymerization inhibitor but can control the molecular weight through a simple procedure to produce a highly branched polymer. Moreover, the weight average molecular weight of the obtained highly branched polymer can be controlled in a range where the polymer can be dissolved in a solvent.

The production method of the present invention can also constantly control the polymerization temperature by adopting means of polymerization under reflux and/or means of dropwise addition of a material solution into a heated solvent, and thus can achieve a stable molecular weight control of a highly branched polymer to be obtained. The method can also safely produce a highly branched polymer having a controlled molecular weight even when the polymer is produced in high volume in an industrial scale.

BEST MODES FOR CARRYING OUT THE INVENTION

Figure 1:
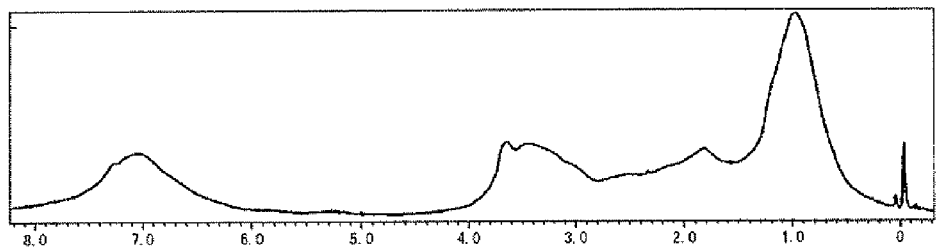
FIG. 1 is a view showing a $^1$H NMR spectrum of a highly branched polymer produced in Example 1.

As described above, the previously proposed methods for producing a highly branched polymer using radical polymerization have a problem of being difficult to control the molecular weight. Hence, the obtained polymer has limited applications after production and therefore has poor practicability.

To address this problem, first, the inventors of the present invention have adopted, as a condition for supplying an initiator fragment radical generated from a radical polymerization initiator without shortage, a reaction temperature 20° C. higher, preferably 25° C. higher than $T_{10}$ or higher (hereinafter also referred to as estimated temperature), instead of a reaction temperature adopted in a common radical polymerization, namely, a temperature ranging from a temperature 30° C. lower than a 10-hour half-life temperature (also referred to as $T_{10}$) of the radical polymerization initiator to a temperature 15° C. higher than $T_{10}$. This achieves immediate degradation of the radical polymerization initiator and the stop reaction of the initiator fragment radical and a propagating terminal radical of the polymer without interruption, and production of a highly branched polymer having a molecular weight range capable of being dissolved in an organic solvent can be produced.

In order to control the molecular weight, it is important that the reaction system immediately reaches the estimated temperature and the reaction temperature is constantly controlled at the estimated temperature during the reaction. In particular, considering the production in an industrial scale, the reaction system in a very large volume has a problem of incapable of maintaining a constant temperature by means of batch charging of reaction materials. Furthermore, the radical polymerization is an exothermic reaction generating heat 5 to 10 times larger than that of acid-base neutralization. Thus, depending on a solvent present in the reaction system, the solvent is supposed to vigorously reach the boiling point due to the reaction heat. Hence, not only the reaction temperature cannot be maintained at a constant temperature, but also the reaction may be dangerous, for example, an explosion may occur.

To address these problems, the inventors of the present invention have adopted means of adding dropwise reaction materials (a monomer and an initiator) to a solvent heated at high temperature. This can lead to the reaction system having a temperature that does not greatly vary; shorten the time required for the radical polymerization initiator to reach the estimated temperature; and degrade the initiator moderately and continuously. Therefore, the molecular weight of the highly branched polymer can be controlled.

The inventors of the present invention can also achieve the production of the polymer in an industrial scale by setting the heating temperature of a solvent to a reflux temperature of the solvent and by performing the polymerization under reflux to maintain the temperature of the reaction system and to secure the safety of the system.

In this manner, the production method of the present invention is characterized by polymerizing a monomer A having two or more radical polymerizable double bonds in a molecule, in the presence of a polymerization initiator B in an amount of 5% by mol to 200% by mol with respect to 1 mol of the monomer A at a temperature 20° C. higher than a 10-hour half-life temperature of the polymerization initiator B or higher.

In the invention, the monomer A having two or more radical polymerizable double bonds in a molecule preferably has at least any one of a vinyl group and a (meth)acrylic group, and is particularly preferably a divinyl compound or a di(meth)acrylate compound. In the present invention, the (meth)acrylate compound means both an acrylate compound and a methacrylate compound. For example, (meth)acrylic acid means acrylic acid and methacrylic acid.

Examples of the monomer A include organic compounds of (A1) to (A7).

(A1) Vinyl hydrocarbons:
(A1-1) aliphatic vinyl hydrocarbons such as isoprene, butadiene, 3-methyl-1,2-butadiene, 2,3-dimethyl-1,3-butadiene, 1,2-polybutadiene, pentadiene, hexadiene, and octadiene;
(A1-2) alicyclic vinyl hydrocarbons such as cyclopentadiene, cyclohexadiene, cyclooctadiene, and norbornadiene; and
(A1-3) aromatic vinyl hydrocarbons such as divinylbenzene, divinyltoluene, divinylxylene, trivinylbenzene, divinylbiphenyl, divinylnaphthalene, divinylfluorene, divinylcarbazole, and divinylpyridine;
(A2) vinyl esters, allyl esters, vinyl ethers, allyl ethers, and vinyl ketones:
(A2-1) vinyl esters such as divinyl adipate, divinyl maleate, divinyl phthalate, divinyl isophthalate, divinyl itaconate, and vinyl (meth)acrylate;
(A2-2) allyl esters such as diallyl maleate, diallyl phthalate, diallyl isophthalate, diallyl adipate, and allyl (meth)acrylate;
(A2-3) vinyl ethers such as divinyl ether, diethylene glycol divinyl ether, and triethylene glycol divinyl ether;
(A2-4) allyl ethers such as diallyl ether, diallyloxyethane, triallyloxyethane, tetraallyloxyethane, tetraallyloxypropane, tetraallyloxybutane, and tetramethallyloxyethane; and
(A2-5) vinyl ketones such as divinyl ketone and diallyl ketone;
(A3) (meth)acrylic acid esters: ethylene glycol di(meth)acrylate, triethylene glycol di(meth)acrylate, propylene glycol di(meth)acrylate, neopentyl glycol di(meth)acrylate, trimethylolpropane tri(meth)acrylate, glycerol tri(meth)acrylate, pentaerythritol tetra(meth)acrylate, alkoxytitanium tri(meth)acrylate, 1,6-hexanediol di(meth)acrylate, 2-methyl-1,8-octanediol di(meth)acrylate, 1,9-nonanediol di(meth)acrylate, 1,10-decanediol di(meth)acrylate, tricyclodecane dimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecyleneoxyethylene glycol di(meth)acrylate, bis[4-(meth)acryloylthiophenyl]sulfide, bis[2-(meth)acryloylthioethyl]sulfide, 1,3-adamantanediol di(meth)acrylate, 1,3-adamantanedimethanol di(meth)acrylate, and the like;
(A4) vinyl compounds having a polyalkylene glycol chain: polyethylene glycol (a molecular weight of 300) di(meth)acrylate, polypropylene glycol (a molecular weight of 500) di(meth)acrylate, and the like;
(A5) nitrogen-containing vinyl compounds: diallylamine, diallyl isocyanurate, diallyl cyanurate, methylenebis(meth)acrylamide, bismaleimide, and the like;
(A6) silicon-containing vinyl compounds: dimethyldivinylsilane, divinylmethylphenylsilane, diphenyldivinylsilane, 1,3-divinyl-1,1,3,3-tetramethyldisilazane, 1,3-divinyl-1,1,3,3-tetraphenyldisilazane, diethoxydivinylsilane, and the like; and
(A7) fluorine-containing vinyl compounds: 1,4-divinylperfluorobutane, 1,4-divinyloctafluorobutane, 1,6-divinylperfluorohexane, 1,6-divinyldodecafluorohexane, 1,8-divinylperfluorooctane, 1,8-divinylhexadecafluorooctane, and the like.

Among them, preferred are aromatic vinyl hydrocarbon compounds in the group (A1-3), vinyl esters, allyl esters, vinyl ethers, allyl ethers, and vinyl ketones in the group (A2), (meth)acrylic acid esters in the group (A3), vinyl compounds having a polyalkylene glycol chain in the group (A4), and nitrogen-containing vinyl compounds in the group (A5), and particularly preferred are divinylbenzene in the group (A1-3), diallyl phthalate in the group (A2), ethylene glycol di(meth)acrylate and 1,3-adamantanedimethanol di(meth)acrylate in the group (A3), and methylenebis(meth)acrylamide in the group (A5). Among them, divinylbenzene and ethylene glycol di(meth)acrylate are more preferred. The monomer A may be a single component or a mixed component of two or more of them.

As the polymerization initiator B in the present invention, an azo polymerization initiator is preferably used. Examples of the azo polymerization initiator include compounds of (1) to (5) shown below.

(1) Azonitrile Compounds:
2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(4-methoxy-2,4-dimethylvaleronitrile), 2-(carbamoylazo)isobutyronitrile, and the like;
(2) Azoamide Compounds:
2,2'-azobis{2-methyl-N-[1,1-bis(hydroxymethyl)-2-hydroxyethyl]propionamide},
2,2'-azobis{2-methyl-N-[2-(1-hydroxybutyl)]propionamide},
2,2'-azobis[2-methyl-N-(2-hydroxyethyl)propionamide],
2,2'-azobis[N-(2-propenyl)-2-methylpropionamide],
2,2'-azobis(N-butyl-2-methylpropionamide),
2,2'-azobis(N-cyclohexyl-2-methylpropionamide), and the like;
(3) Cyclic Azoamidine Compounds:
2,2'-azobis[2-(2-imidazolin-2-yl)propane]dihydrochloride,
2,2'-azobis[2-(2-imidazolin-2-yl)propane]disulfate dihydrate,
2,2'-azobis[2-[1-(2-hydroxyethyl)-2-imidazolin-2-yl]propane]dihydrochloride,
2,2'-azobis[2-(2-imidazolin-2-yl)propane],
2,2'-azobis(1-imino-1-pyrrolidino-2-methylpropane) dihydrochloride, and the like;
(4) Azoamidine Compounds:
2,2'-azobis(2-methylpropionamidine) dihydrochloride,
2,2'-azobis[N-(2-carboxyethyl)-2-methylpropionamidine] tetrahydrate, and the like; and
(5) Others:
dimethyl 2,2'-azobisisobutyrate, 4,4'-azobis(4-cyanovaleric acid),
2,2'-azobis(2,4,4-trimethylpentane), 1,1'-azobis(1-acetoxy-1-phenylethane), and the like.

Among the azo polymerization initiators, an azo polymerization initiator having a 10-hour half-life temperature of 30 to 120° C. is preferred, an azo polymerization initiator having a 10-hour half-life temperature of 30 to 70° C. is particularly preferred, and an azo polymerization initiator having a 10-hour half-life temperature of 40 to 70° C. is more preferred.

As the azo polymerization initiator satisfying such conditions, among the azo polymerization initiators, dimethyl 2,2'-azobisisobutyrate and 2,2'-azobis(2-methylbutyronitrile) are especially preferred.

The polymerization initiator B is used in an amount of 5% by mol to 200% by mol with respect to 1 mol of the monomer A having two or more radical polymerizable double bonds in a molecule, preferably used in an amount of 20% by mol to 150% by mol, and more preferably used in an amount of 50% by mol to 100% by mol.

In the production method of the present invention, a polymerizable compound having a radical polymerizable double bond may be added in addition to the monomer A and the polymerization initiator B for copolymerization. Examples of the polymerizable compound include vinyl compounds such as styrene and (meth)acrylic compounds such as methyl (meth)acrylate and t-butyl (meth)acrylate.

In the production method of the present invention, for the polymerization of the monomer A in the presence of the polymerization initiator B in a predetermined amount, examples of the polymerization method include known methods such as solution polymerization, dispersion polymerization, precipitation polymerization, and bulk polymerization. Among them, the solution polymerization or the precipitation polymerization is preferred. In particular, from the viewpoint of the molecular weight control, the reaction is preferably performed in an organic solvent through the solution polymerization.

Examples of the organic solvent used for the reaction include aromatic hydrocarbon solvents such as benzene, toluene, xylene, ethylbenzene, and tetralin; aliphatic or alicyclic hydrocarbon solvents such as n-hexane, n-heptane, mineral spirits, and cyclohexane; halogenated solvents such as methyl chloride, methyl bromide, methyl iodide, methylene dichloride, chloroform, carbon tetrachloride, trichloroethylene, perchloroethylene, and ortho-dichlorobenzene; ester or ester ether solvents such as ethyl acetate, butyl acetate, methoxybutyl acetate, methyl cellosolve acetate, ethyl cellosolve acetate, and propylene glycol monomethyl ether acetate; ether solvents such as diethyl ether, tetrahydrofuran, 1,4-dioxane, ethyl cellosolve, butyl cellosolve, and propylene glycol monomethyl ether; ketone solvents such as acetone, methyl ethyl ketone, methyl isobutyl ketone, di-n-butyl ketone, and cyclohexanone; alcohol solvents such as methanol, ethanol, n-propanol, isopropanol, n-butanol, isobutanol, tert-butanol, 2-ethylhexyl alcohol, benzyl alcohol, ethylene glycol, and propylene glycol; amide solvents such as N,N-dimethylformamide and N,N-dimethylacetamide; sulfoxide solvents such as dimethyl sulfoxide; heterocyclic compound solvents such as N-methyl-2-pyrrolidone; and a mixed solvent of two or more of them.

Among them, preferred are aromatic hydrocarbon solvents, halogenated solvents, ester solvents, ether solvents, ketone solvents, alcohol solvents, amide solvents, and sulfoxide solvents.

Among them, an organic solvent having a boiling point of 90 to 200° C. under atmospheric pressure is preferably used, and examples of particularly preferred organic solvents include toluene, xylene, ortho-dichlorobenzene, butyl acetate, dioxane, N,N-dimethylformamide, N,N-dimethylacetamide, propylene glycol monomethyl ether, propylene glycol monomethyl ether acetate, and n-propanol.

When the polymerization is performed in the presence of an organic solvent, the content of the organic solvent is preferably 1 to 100 parts by mass and more preferably 5 to 50 parts by mass with respect to 1 part by mass of the monomer A.

The polymerization is performed under ambient pressure, under pressure in a closed system, or under reduced pressure, and preferably performed under ambient pressure from the viewpoints of simple equipment and operation. Furthermore, the polymerization is preferably performed under an atmosphere of inert gas such as $N_2$.

The polymerization is performed at a temperature 20° C. higher than a 10-hour half-life temperature of the polymerization initiator B or higher. More specifically, the polymerization is preferably performed by adding dropwise a solution containing the monomer A, the polymerization initiator B, and an organic solvent into the organic solvent that is maintained to have a temperature 20° C. higher than the 10-hour half-life temperature of the polymerization initiator B or higher.

More preferably, the polymerization is performed at a reflux temperature of the organic solvent under a reaction pressure.

The highly branched polymer obtained by the production method of the present invention preferably has a weight average molecular weight (hereinafter referred to as Mw) of 1,000 to 200,000, more preferably 5,000 to 100,000, and most preferably 10,000 to 60,000 in terms of polystyrene determined by gel permeation chromatography.

After the completion of the polymerization, the obtained highly branched polymer is recovered by any method and may be subjected to after-treatments such as washing as necessary. Examples of the method for recovering the polymer from the reaction solution include reprecipitation.

EXAMPLES

Hereinafter, the present invention will be described in further detail with reference to examples, but the present invention is not limited to them.

Apparatuses and conditions used for the preparation of samples and for the analysis of physical properties in the examples are as follows.

(1) Calorimeter (Calorimetric Measurement)
Apparatus: hybrid calorimeter manufactured by TODOROKI SANGYO CO., LTD.
Refrigerant: propylene glycol (2) Gel Permeation Chromatography (GPC)
Apparatus: HLC-8220 GPC manufactured by Tosoh Corporation
Column: Shodex (registered trademark) KF-804 L, KF-805 L
Column temperature: 40° C.
Solvent: tetrahydrofuran
Detector: RI (3) $^1$H NMR Spectrometry and $^{13}$C NMR Spectrometry
Apparatus: JNM-ECA700 manufactured by JEOL DATUM Ltd.
Solvent: $CDCl_3$
Internal standard: tetramethylsilane Each abbreviation means as follows.

DVB: divinylbenzene (DVB-960 manufactured by Nippon Steel Chemical Co., Ltd.)

EGDMA: ethylene glycol dimethacrylate (1G manufactured by Shin Nakamura Chemical Co., Ltd.)

MAIB: dimethyl 2,2'-azobisisobutyrate (MAIB manufactured by Otsuka Chemical Co., Ltd., 10-hour half-life temperature: 67° C.)

AMEN: 2,2'-azobis(2-methylbutyronitrile) (AMBN manufactured by Otsuka Chemical Co., Ltd., 10-hour half-life temperature: 67° C.)

Reference Example 1

Reaction Calorimetry During Production of Highly Branched Polymer Using DVB and MAIB

Into a glass jacketed reactor of a calorimeter, 391 g of toluene (manufactured by Kanto Chemical Co., Inc., extra pure reagent) was placed, and stirred with nitrogen flow for 5 minutes for nitrogen substitution. Then, the reactor was heated using a hot water bath set at 130° C. until the temperature in the reactor reached 100° C. Next, in order to constantly maintain the temperature in the reactor at 100° C. during the reaction, the temperature of a constant temperature chamber was set at 75° C.

Separately, into a 1-L reaction flask, 21 g (160 mmol) of DVB, 29 g (128 mmol) of MATE, and 391 g of toluene (manufactured by Kanto Chemical Co., Inc., extra pure reagent) were placed, and stirred with nitrogen flow for 5 minutes for nitrogen substitution. At this time, the temperature in the reaction flask was 25° C.

Into the toluene heated at 100° C. in the glass jacketed reactor, the content was added dropwise from the 1-L reaction flask containing DVB and MAIB using a dropping pump over 60 minutes. After the completion of the dropwise addition, the mixture was aged for 2 hours.

The calorific value during the dropwise addition and the aging after the dropwise addition was determined to give a calorific value of 502.5 kJ/mol in terms of DVB mole. This shows that the polymerization generates an amount of heat that is about 5 to 10 times larger than the calorific value of the neutralization, while common neutralization of an acid and a base gives a calorific value of 50 to 100 kJ/mol. Therefore, it was ascertained that the reaction is a process generating a large amount of heat.

Example 1

Production of Highly Branched Polymer Using DVB and MAIB (Polymerization Temperature at 111° C.)

Into a 500-mL reaction flask, 74 g of toluene (manufactured by Kanto Chemical Co., Inc., extra pure reagent) was placed, and stirred with nitrogen flow for 5 minutes for nitrogen substitution, and the flask was heated until toluene was refluxed (the temperature in the flask: 111° C.).

Separately, into a 200-mL reaction flask, 3.9 g (30 mmol) of DVB, 5.5 g (24 mmol) of MAIB, and 74 g of toluene (manufactured by Kanto Chemical Co., Inc., extra pure reagent) were placed, and stirred with nitrogen flow for 5 minutes for nitrogen substitution.

Into the refluxing toluene in the 500-mL reaction flask, the content was added dropwise from the 200-mL reaction flask containing DVB and MAIB using a dropping pump over 90 minutes. After the completion of the dropwise addition, the mixture was aged for 6 hours. The obtained reaction solution had a weight average molecular weight Mw of 40,000 and a degree of dispersion: Mw (weight average molecular weight)/Mn (number average molecular weight) of 6.7 in terms of polystyrene determined by GPC.

Next, from the reaction solution, 121 g of toluene was removed by evaporation using a rotary evaporator, and the residue was added to 391 g of methanol (manufactured by Kanto Chemical Co., Inc., guaranteed reagent) cooled to 0° C. to precipitate a polymer as a slurry. The slurry was filtered under reduced pressure, and the residue was dried in vacuum to give 6.1 g of a target compound as white powder.

Figure 2:
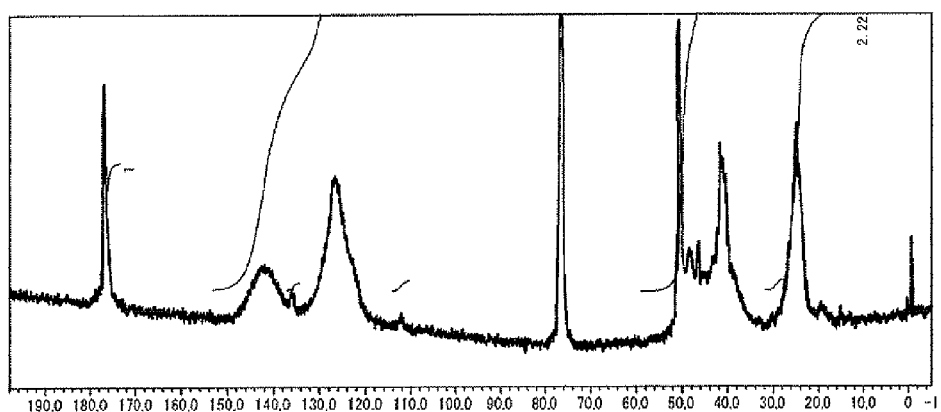
FIG. 2 is a view showing a $^{13}$C NMR spectrum of the highly branched polymer produced in Example 1.

The measurement results of $^1$H NMR and $^{13}$C NMR spectra of the obtained target compound are shown in FIG. 1 ($^1$H NMR) and FIG. 2 ($^{13}$C NMR).

The polymer after the purification by reprecipitation had a weight average molecular weight Mw of 47,000 and a degree of dispersion: Mw/Mn of 3.8 in terms of polystyrene determined by GPC.

Example 2

Production of highly branched polymer using DVB and MAIB (Polymerization Temperature at 120° C.)

Into a 500-mL reaction flask, 74 g of xylene (manufactured by JUNSEI CHEMICAL CO., LTD., guaranteed reagent) was placed, and stirred with nitrogen flow for 5 minutes for nitrogen substitution, and the flask was heated so that the temperature in the flask would be constant at 120° C.

Separately, into a 200-mL reaction flask, 3.9 g (30 mmol) of DVB, 5.5 g (24 mmol) of MAIB, and 74 g of xylene (manufactured by JUNSEI CHEMICAL CO., LTD., guaranteed reagent) were placed, and stirred with nitrogen flow for 5 minutes for nitrogen substitution.

Into the xylene heated at 120° C. in the 500-mL reaction flask, the content was added dropwise from the 200-mL reaction flask containing DVB and MAIB using a dropping pump over 90 minutes. After the completion of the dropwise addition, the mixture was aged for 6 hours. The obtained reaction solution had a weight average molecular weight Mw of 21,000 and a degree of dispersion: Mw/Mn of 6.1 in terms of polystyrene determined by GPC.

Next, from the reaction solution, 121 g of xylene was removed by evaporation using a rotary evaporator, and the residue was added to 391 g of methanol cooled to 0° C. to precipitate a polymer as a slurry. The slurry was filtered under reduced pressure, and the residue was dried in vacuum to give 5.2 g of a target compound as white powder.

The polymer after the purification by reprecipitation had a weight average molecular weight Mw of 27,000 and a degree of dispersion: Mw/Mn of 3.2 in terms of polystyrene determined by GPC.

Example 3

Production of Highly Branched Polymer Using DVB and AMBN (Polymerization Temperature at 111° C.)

Into a 1-L reaction flask, 265 g of toluene (manufactured by Kanto Chemical Co., Inc., extra pure reagent) was placed, and stirred with nitrogen flow for 5 minutes for nitrogen substitution, and the flask was heated until toluene was refluxed (the temperature in the flask: 111° C.).

Separately, into a 500-mL reaction flask, 15.6 g (120 mmol) of DVB, 16.2 g (84 mmol) of AMBN, and 265 g of toluene (manufactured by Kanto Chemical Co., Inc., extra pure reagent) were placed, and stirred with nitrogen flow for 5 minutes for nitrogen substitution.

Into the refluxing toluene in the 1-L reaction flask, the content was added dropwise from the 500-mL reaction flask containing DVB and AMBN using a dropping pump over 90 minutes. After the completion of the dropwise addition, the mixture was aged for 1 hour. The obtained reaction solution had a weight average molecular weight Mw of 29,000 and a degree of dispersion: Mw/Mn of 6.7 in terms of polystyrene determined by GPC.

Next, from the reaction solution, 427 g of toluene was removed by evaporation using a rotary evaporator, and the residue was added to 1,570 g of methanol cooled to 0° C. to precipitate a polymer as a slurry. The slurry was filtered under reduced pressure, and the residue was dried in vacuum to give 15.7 g of a target compound as white powder.

Figure 3:
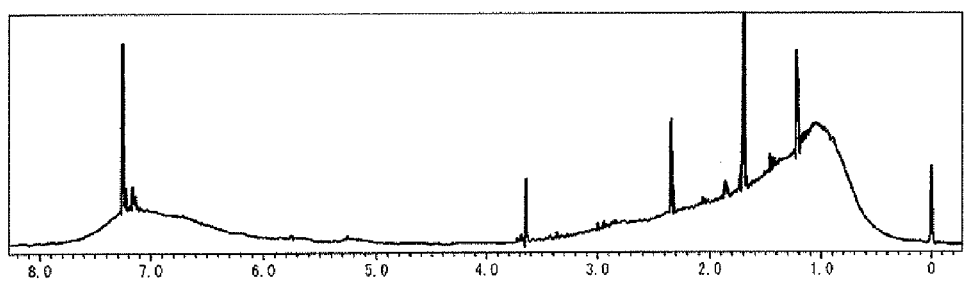
FIG. 3 is a view showing a NMR spectrum of a highly branched polymer produced in Example 3.
Figure 4:
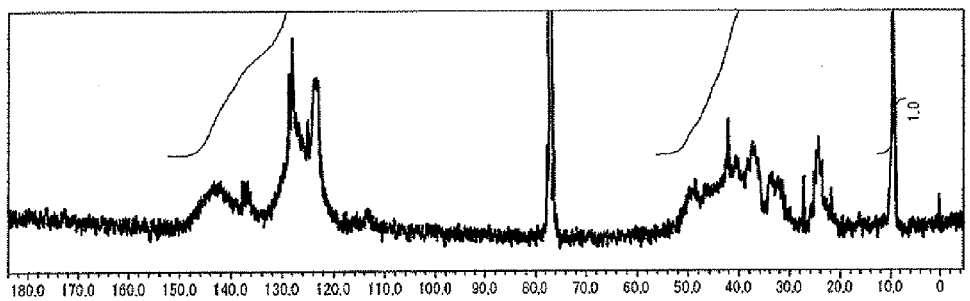
FIG. 4 is a view showing a $^{13}$C NMR spectrum of the highly branched polymer produced in Example 3.

The measurement results of $^1$H NMR and $^{13}$C NMR spectra of the obtained target compound are shown in FIG. 3 ($^1$H NMR) and FIG. 4 ($^{13}$C NMR).

The polymer after the purification by reprecipitation had a weight average molecular weight Mw of 34,000 and a degree of dispersion: Mw/Mn of 2.9 in terms of polystyrene determined by GPC.

Example 4

Production of Highly Branched Polymer Using EGDMA and MAIB (Polymerization Temperature at 111° C.)

Into a 300-mL reaction flask, 79 g of toluene (manufactured by Kanto Chemical Co., Inc., extra pure reagent) was placed, and stirred with nitrogen flow for 5 minutes for nitrogen substitution, and the flask was heated until toluene was refluxed (temperature in the flask: 111° C.).

Separately, into a 200-mL reaction flask, 9.9 g (50 mmol) of EGDMA, 5.8 g (25 mmol) of MAIB, and 79.2 g of toluene (manufactured by Kanto Chemical Co., Inc., extra pure reagent) were placed, and stirred with nitrogen flow for 5 minutes for nitrogen substitution, and the flask was cooled to 0° C. in an ice bath.

Into the refluxing toluene in the 300-mL reaction flask, the content was added dropwise from the 200-mL reaction flask cooled to 0° C. using a dropping pump over 90 minutes (the solvent amount: (79+79.2)/9.9=16 parts by mass/EGDMA). After the completion of the dropwise addition, the mixture was aged for 1 hour. The obtained reaction solution had a weight average molecular weight Mw of 17,000 and a degree of dispersion: Mw/Mn of 6.1 in terms of polystyrene determined by GPC.

Next, the reaction solution was added to 748 g of hexane to precipitate a polymer as a slurry. The slurry was filtered under reduced pressure, and the residue was dried in vacuum to give 10.6 g of a target compound as white powder.

The polymer after the purification by reprecipitation had a weight average molecular weight Mw of 17,000 and a degree of dispersion: Mw/Mn of 4.8 in terms of polystyrene determined by GPC.

Example 5

Scale-Up Example of Example 1

The operation of nitrogen break after the decompression of a 500-L reactor to 10 kPa was performed three times for nitrogen substitution, and 99 kg of toluene (manufactured by Toyo Gosei Co., Ltd., Cactus solvent) was placed. Then, steam at 0.2 MPaG flowed through a jacket of the reactor to raise the temperature until the temperature in the reactor reached 111° C.

Separately, into a 140-L dissolution vessel, nitrogen flowed at a flow rate of 3 m$^3$/hour for 10 minutes for nitrogen substitution, then 5.2 kg (40 mol) of DVB, 7.4 kg (32 mol) of MAIB, and 89 kg of toluene (manufactured by Toyo Gosei Co., Ltd., Cactus solvent) were placed, and nitrogen flowed at a flow rate of 1 m$^3$/hour to prepare a material solution.

The material solution was added dropwise into the 500-L reactor containing toluene under reflux at an addition rate of 2 kg/minute using a diaphragm pump while maintaining the temperature in the 500-L reactor at 110° C. or higher. Next, the 140-L dissolution vessel was washed with 10 kg of toluene, and then the toluene was added dropwise using a diaphragm pump in a similar manner, and the mixture was aged for 6 hours. Then, well water (about 15° C.) flowed through the jacket of the 500-L reactor to cool the reaction solution. The obtained reaction solution had a weight average molecular weight Mw of 42,000 and a degree of dispersion: Mw/Mn of 7.1 in terms of polystyrene determined by GPC.

Next, the pressure in the 500-L reactor was reduced to 10 kPa and warm water at 65° C. flowed through the jacket to remove 160 kg of toluene by evaporation. Then, from the 500-L reactor, about 48 kg of the concentrated reaction solution was removed to a polyethylene tank.

Subsequently, the operation of nitrogen break after the decompression of a 1,000-L reprecipitation vessel to 10 kPa was performed three times for nitrogen substitution, and 520 kg of methanol (manufactured by MITSUBISHI GAS CHEMICAL COMPANY, INC.) was placed. Brine flowed through a jacket of the reprecipitation vessel for cooling until the temperature in the reprecipitation vessel reached about 0° C.

Then, nitrogen flowed into a 115-L drip vessel at a flow rate of 3 m$^3$/hour for 10 minutes for nitrogen substitution, and the concentrated reaction solution was placed in the drip vessel. The reaction solution placed in the drip vessel was added dropwise to methanol in the reprecipitation vessel over 1 hour to precipitate a polymer as a slurry. The slurry was filtered under pressure, and the cake was washed with 52 kg of methanol that was cooled to about 0° C. The obtained cake was transferred onto a rectangular tray, and the tray was placed in vacuum drier and dried at 50° C. and 10 kPa for 20 hours to give 8.18 kg of a target compound as white powder.

The obtained product had a weight average molecular weight Mw of 48,000 and a degree of dispersion: Mw/Mn of 3.5 in terms of polystyrene determined by GPC.

Example 6

Production of Highly Branched Polymer Using EGDMA and MAIB (Change in Solvent Amount)

Into a 300-mL reaction flask, 59 g of toluene (manufactured by Kanto Chemical Co., Inc., extra pure reagent) was placed, and stirred with nitrogen flow for 5 minutes for nitrogen substitution, and the flask was heated until toluene was refluxed (temperature in the flask: 111° C.).

Separately, into a 200-mL reaction flask, 9.9 g (50 mmol) of EGDMA, 5.8 g (25 mmol) of MAIB, and 59 g of toluene (manufactured by Kanto Chemical Co., Inc., extra pure reagent) were placed, and stirred with nitrogen flow for 5 minutes for nitrogen substitution, and the flask was cooled to 0° C. in an ice bath.

Into the refluxing toluene in the 300-mL reaction flask, the content was added dropwise from the 200-mL reaction flask cooled to 0° C. using a dropping pump over 90 minutes (the solvent amount: (59+59)/9.9=12 parts by mass/EGDMA). After the completion of the dropwise addition, the mixture was aged for 1 hour. The obtained reaction solution had a weight average molecular weight Mw of 33,000 and a degree of dispersion: Mw/Mn of 11.1 in terms of polystyrene determined by GPC.

Next, the reaction solution was added to 748 g of hexane to precipitate a polymer as a slurry. The slurry was filtered under reduced pressure, and the residue was dried in vacuum to give 10.9 g of a target compound as white powder.

The polymer after the purification by reprecipitation had a weight average molecular weight Mw of 36,000 and a degree of dispersion: Mw/Mn of 6.8 in terms of polystyrene determined by GPC.

Example 7

Production of Highly Branched Polymer Using EGDMA and MAIB (Change in Solvent Amount)

Into a 1-L reaction flask, 277 g of toluene (manufactured by Kanto Chemical Co., Inc., extra pure reagent) was placed, and stirred with nitrogen flow for 5 minutes with stirring for nitrogen substitution, and the flask was heated until toluene was refluxed (the temperature in the flask: 111° C.).

Separately, into a 500-mL reaction flask, 19.8 g (100 mmol) of EGDMA, 11.5 g (50 mmol) of MAIB, and 277 g of toluene (manufactured by Kanto Chemical Co., Inc., extra pure reagent) were placed, and stirred with nitrogen flow for 5 minutes for nitrogen substitution, and the flask was cooled to 0° C. in an ice bath.

Into the refluxing toluene in the 1-L reaction flask, the content was added dropwise from the 500-mL reaction flask cooled to 0° C. using a dropping pump over 90 minutes (the solvent amount: (277+277)/11.5=48 parts by mass/ EGDMA). After the completion of the dropwise addition, the mixture was aged for 1 hour. The obtained reaction solution had a weight average molecular weight Mw of 5,800 and a degree of dispersion: Mw/Mn of 3.1 in terms of polystyrene determined by GPC.

Next, the reaction solution was added to 1,496 g of hexane to precipitate a polymer as a slurry. The slurry was filtered under reduced pressure, and the residue was dried in vacuum to give 19.1 g of a target compound as white powder.

The polymer after the purification by reprecipitation had a weight average molecular weight Mw of 6,200 and a degree of dispersion: Mw/Mn of 2.8 in terms of polystyrene determined by GPC.

Example 8

Scale-Up Example of Example 4

The operation of nitrogen break after the decompression of a 500-L reactor to 10 kPa was performed three times for nitrogen substitution, and 73 kg of toluene (manufactured by Toyo Gosei Co., Ltd., Cactus solvent) was placed. Then, steam at 0.2 MPaG flowed through a jacket of the reactor to raise the temperature until the temperature in the reactor reached 111° C.

Separately, into a 140-L dissolution vessel, nitrogen flowed at a flow rate of 3 m³/hour for 10 minutes for nitrogen substitution, then 12.1 kg (60.1 mol) of EGDMA, 8.4 kg (36.6 mol) of MAIB, and 73 kg of toluene (manufactured by Toyo Gosei Co., Ltd., Cactus solvent) were placed, and nitrogen flowed at a flow rate of 1 m³/hour to prepare a material solution.

The material solution was added dropwise into the 500-L reactor containing toluene under reflux at an addition rate of 2 kg/minute using a diaphragm pump while maintaining the temperature in the 500-L reactor at 110° C. or higher. Next, the 140-L dissolution vessel was washed with 10 kg of toluene, and then the toluene was added dropwise using a diaphragm pump in a similar manner, and the mixture was aged for 2 hours. Then, well water (about 15° C.) flowed through the jacket of the 500-L reactor to cool the reaction solution. The obtained reaction solution had a weight average molecular weight Mw of 19,000 and a degree of dispersion: Mw/Mn of 6.2 in terms of polystyrene determined by GPC.

Next, the pressure in the 500-L reactor was reduced to 10 kPa and warm water at 65° C. flowed through the jacket to remove 85 kg of toluene by evaporation. Then, from the 500-L reactor, about 80 kg of the concentrated reaction solution was removed to a polyethylene tank.

Subsequently, the operation of nitrogen break after the decompression of a 1,000-L reprecipitation vessel to 10 kPa was performed three times for nitrogen substitution, and 453 kg of hexane (manufactured by Mitsubishi Shoji Chemical Corporation, product name: normal-hexane (high purity)) and 151 kg of ethanol (manufactured by Japan Alcohol Trading Co., Ltd, product name: 99 degree absolute synthetic alcohol) were placed. Brine flowed through a jacket of the reprecipitation vessel for cooling until the temperature in the reprecipitation vessel reached about 0° C.

Then, nitrogen flowed into a 115-L drip vessel at a flow rate of 3 m³/hour for 10 minutes for nitrogen substitution, and the concentrated reaction solution was placed in the drip vessel. The reaction solution placed in the drip vessel was added dropwise to hexane/ethanol in the reprecipitation vessel over 1 hour to precipitate a polymer as a slurry. The slurry was filtered under reduced pressure, and the cake was washed with 140 kg of hexane/ethanol (mass ratio: 3/1) that was cooled to about 0° C. The obtained cake was transferred onto a rectangular tray, and the tray was placed in vacuum drier and dried at 50° C. and 10 kPa for 19 hours to give 11.6 kg of a target compound as white powder.

The obtained product had a weight average molecular weight Mw of 22,000 and a degree of dispersion: Mw/Mn of 3.3 in terms of polystyrene determined by GPC.

Comparative Example 1

Production of Highly Branched Polymer Using DVB and MAIB (Polymerization Temperature at 80° C.)

Into a 500-mL reaction flask, 74 g of toluene (manufactured by Kanto Chemical Co., Inc., extra pure reagent) was placed, and stirred with nitrogen flow for 5 minutes for nitrogen substitution, and the flask was heated until toluene had a temperature of 80° C.

Separately, into a 200-mL reaction flask, 3.9 g (30 mmol) of DVB, 5.5 g (24 mmol) of MAIB, and 74 g of toluene (manufactured by Kanto Chemical Co., Inc., extra pure reagent) were placed, and stirred with nitrogen flow for 5 minutes for nitrogen substitution.

Into the toluene heated at 80° C. in the 500-mL reaction flask, the content was added dropwise from the 200-mL reaction flask containing DVB and MAIB using a dropping pump over 90 minutes. After the completion of the dropwise addition, the mixture was aged for 6 hours. The obtained reaction solution had a weight average molecular weight Mw of 570, 000 and a degree of dispersion: Mw/Mn of 45.1 in terms of polystyrene determined by GPC.

Next, from the reaction solution, 121 g of toluene was removed by evaporation using a rotary evaporator, and the residue was added to 391 g of methanol cooled to 0° C. to precipitate a polymer as a slurry. The slurry was filtered under reduced pressure, and the residue was dried in vacuum to give 5.7 g of a target compound as white powder.

The polymer after the purification by reprecipitation had a weight average molecular weight Mw of 580,000 and a degree of dispersion: Mw/Mn of 15.7 in terms of polystyrene determined by GPC.

TABLE 1

| | Monomer | Polymerization initiator | Polymerization | | Mw (upper line) Mw/Mn (lower line) | | Yield (%) |
|---|---|---|---|---|---|---|---|
| | | | $T_{10}$ (°C.) | temperature T (°C.) | $T - T_{10}$ (°C.) | Before purification | After purification | |

| | Monomer | Initiator | $T_{10}$ (°C.) | T (°C.) | $T-T_{10}$ (°C.) | Before purification | After purification | Yield (%) |
|---|---|---|---|---|---|---|---|---|
| Example 1 | DVB | MAIB | 67 | 111 | 44 | 40,000 / 6.7 | 47,000 / 3.8 | 68 |
| Example 2 | DVB | MAIB | 67 | 120 | 53 | 21,000 / 6.1 | 27,000 / 3.2 | 59 |
| Example 3 | DVB | AMBN | 67 | 111 | 44 | 29,000 / 6.7 | 34,000 / 2.9 | 50 |
| Example 5 | DVB | MAIB | 67 | 111 | 44 | 42,000 / 7.1 | 48,000 / 3.5 | 69 |
| Example 4 | EGDMA | MAIB | 67 | 111 | 44 | 17,000 / 6.1 | 17,000 / 4.8 | 71 |
| Example 6 | EGDMA | MAIB | 67 | 111 | 44 | 33,000 / 11.1 | 36,000 / 6.8 | 73 |
| Example 7 | EGDMA | MAIB | 67 | 111 | 44 | 5,800 / 3.1 | 6,200 / 2.8 | 64 |
| Example 8 | EGDMA | MAIB | 67 | 111 | 44 | 19,000 / 6.2 | 22,000 / 3.3 | 70 |
| Comparative Example 1 | DVB | MAIB | 67 | 80 | 13 | 570,000 / 45.1 | 580,000 / 15.7 | 65 |

$T_{10}$: 10-Hour half-life temperature

As shown in Example 1 to Example 8, the setting of the polymerization temperature to a temperature about 40° C. higher than the 10-hour half-life temperature can produce the highly branched polymer having a controlled molecular weight. In particular, even in the case of the scale-up to an industrial scale (Example 5 and Example 8), the highly branched polymer having a controlled molecular weight and having a narrow degree of dispersion could be produced.

In contrast, in Comparative Example 1 where the production was performed at a temperature about 10° C. higher than the 10-hour half-life temperature, the obtained polymer had a very high molecular weight and a very wide molecular weight distribution.

Furthermore, as shown in Examples 4 (16 parts by mass), Example 6 (12 parts by mass), and Example 7 (48 parts by mass) where each solvent amount for polymerization was changed with respect to the amount of the monomer A, it was ascertained that the adjustment of the polymerization concentration of the monomer A can achieve the molecular weight control of the obtained highly branched polymer.

Examples 9 to 11

Effect of Molar Ratio of Initiator

Into a 50-mL reaction flask, DVB and MAIB were placed in amounts as shown in Table 2 together with 4.7 g of toluene, and nitrogen flowed for 5 minutes with stirring for nitrogen substitution. The reaction solution was heated to a temperature in the flask of 100° C., and subsequently stirred at 100° C. for 1 hour. The reaction product was subjected to GPC analysis to determine the weight average molecular weight Mw and the degree of dispersion: Mw/Mn in terms of polystyrene. The results are summarized in Table 2.

TABLE 2

| | DVB | | MAIB | | | |
|---|---|---|---|---|---|---|
| | [g] | [mmol] | [g] | [mmol] | Mw | Mw/Mn |
| Example 9 | 0.130 | 1.0 | 0.115 | 0.5 | 445,000 | 152 |
| Example 10 | 0.130 | 1.0 | 0.230 | 1.0 | 21,000 | 10 |
| Example 11 | 0.130 | 1.0 | 0.460 | 2.0 | 2,900 | 2.4 |

As shown in Example 9 to Example 11, it was ascertained that the adjustment of the molar ratio of the polymerization initiator used can achieve the molecular weight control of the obtained highly branched polymer.

RELATED ART DOCUMENTS

Patent Documents

Patent Document 1: Japanese Patent No. 4009700
Patent Document 2: Japanese Patent Application Publication No. JP-A-2008-38110

Non-patent Documents

Non-patent Document 1: Tsuneyuki Sato, Nobuyuki Sato, Makiko Seno, Tomohiro Hirano, J. Polym. Sci. Part A, 41, 3038-3047 (2003)
Non-patent Document 2: Tomohiro Hirano, Naoki Higashida, Hongwei Wang, Makiko Seno, Tsuneyuki Sato, J. Appl. Polym. Sci., 100, 664-670 (2006)
Non-patent Document 3: Tomohiro Hirano, Hiroshi Mara, Takashi Miyagi, Hongwei Wang, Makiko Seno, Tsuneyuki Sato, Macromol. Chem. Phys., 206, 860-868 (2005)
Non-patent Document 4: Synthesis and Reaction of Polymer (1), page 33, edited by The Society of Polymer Science, Japan, published by Kyoritsu Shuppan Co., Ltd. (1992)

The invention claimed is:

1. A method for producing a highly branched polymer comprising polymerizing a monomer A having two or more radical polymerizable double bonds in a molecule, in the presence of a polymerization initiator B in an amount of 5% by mol to 200% by mol with respect to 1 mol of the monomer A at a temperature 20° C. higher than a 10-hour half-life temperature of the polymerization initiator B or higher, wherein the polymerization reaction is performed in an organic solvent having a boiling point of 90 to 200° C. under atmospheric pressure.

2. The method for producing a highly branched polymer according to claim 1, wherein the polymerization reaction is performed by adding dropwise a solution containing the monomer A, the polymerization initiator B, and the organic solvent into the organic solvent maintained to have a temperature 20° C. higher than the 10-hour half-life temperature of the polymerization initiator B or higher.

3. The method for producing a highly branched polymer according to claim 1, wherein the polymerization reaction is performed at a reflux temperature of the organic solvent.

4. The method for producing a highly branched polymer according to claim 1, wherein the monomer A is a compound having at least any one of a vinyl group and a (meth)acrylic group.

5. The method for producing a highly branched polymer according to claim 4, wherein the monomer A is a divinyl compound or a di(meth)acrylate compound.

6. The method for producing a highly branched polymer according to claim 5, wherein the monomer A is divinylbenzene or ethylene glycol di(meth)acrylate.

7. The method for producing a highly branched polymer according to claim 1, wherein the polymerization initiator B is an azo polymerization initiator.

8. The method for producing a highly branched polymer according to claim 7, wherein the polymerization initiator B is an initiator having a 10-hour half-life temperature of 30 to 120° C.

9. The method for producing a highly branched polymer according to claim 8, wherein the polymerization initiator B is an initiator having a 10-hour half-life temperature of 40 to 70° C.

10. The method for producing a highly branched polymer according to claim 9, wherein the polymerization initiator B is dimethyl 2,2'-azobisisobutyrate or 2,2'-azobis(2-methylbutyronitrile).

11. The method for producing a highly branched polymer according to claim 1, wherein the highly branched polymer is a polymer having a weight average molecular weight (Mw) of 1,000 to 200,000 in terms of polystyrene determined by gel permeation chromatography.

* * * * *